Sept. 19, 1950 J. O. FARMER ET AL 2,522,571
SYSTEM OF AND MACHINE FOR FABRICATING BASKET WEBS
Filed Aug. 7, 1946 10 Sheets-Sheet 1

Fig. 1.

INVENTOR.
JAMES O. FARMER
ROBERT C. CARROLL
CLAUDE TILLERY
BY
Schley and Schley
ATTORNEYS Sept. 19, 1950 J. O. FARMER ET AL 2,522,571
SYSTEM OF AND MACHINE FOR FABRICATING BASKET WEBS
Filed Aug. 7, 1946 10 Sheets-Sheet 2

INVENTOR.
JAMES O. FARMER
ROBERT C. CARROLL
BY CLAUDE TILLERY

Ehley and Ehley
ATTORNEYS

Sept. 19, 1950 J. O. FARMER ET AL 2,522,571
SYSTEM OF AND MACHINE FOR FABRICATING BASKET WEBS
Filed Aug. 7, 1946 10 Sheets-Sheet 3

INVENTOR.
JAMES O. FARMER
ROBERT C. CARROLL
CLAUDE TILLERY
BY
Schley and Schley
ATTORNEYS Sept. 19, 1950     J. O. FARMER ET AL     2,522,571
SYSTEM OF AND MACHINE FOR FABRICATING BASKET WEBS
Filed Aug. 7, 1946     10 Sheets-Sheet 4
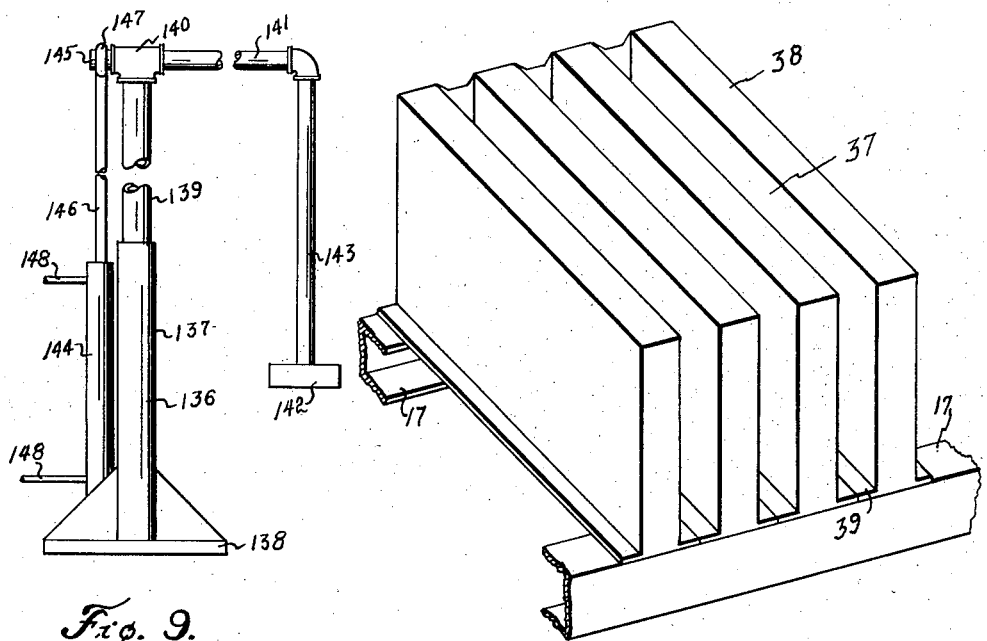
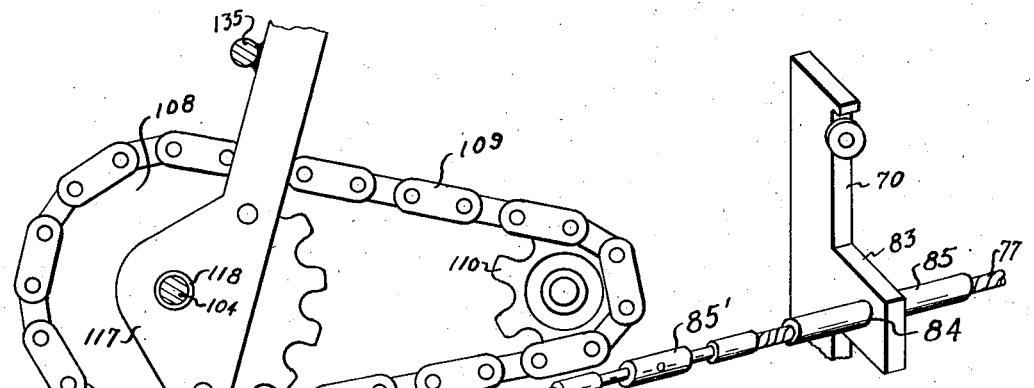
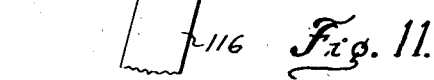
INVENTOR.
JAMES O. FARMER
ROBERT C. CARROLL
CLAUDE TILLERY
BY
Schley and Schley
ATTORNEYS INVENTOR.
JAMES O. FARMER
ROBERT C. CARROLL
CLAUDE TILLERY
BY
Athley and Athley
ATTORNEYS Sept. 19, 1950     J. O. FARMER ET AL     2,522,571
SYSTEM OF AND MACHINE FOR FABRICATING BASKET WEBS
Filed Aug. 7, 1946     10 Sheets-Sheet 6

INVENTOR.
JAMES O. FARMER
ROBERT C. CARROLL
CLAUDE TILLERY.
BY
Ashley and Ashley
ATTORNEYS

*INVENTOR.*
JAMES O. FARMER
ROBERT C. CARROLL
CLAUDE TILLERY

Sept. 19, 1950    J. O. FARMER ET AL    2,522,571
SYSTEM OF AND MACHINE FOR FABRICATING BASKET WEBS
Filed Aug. 7, 1946    10 Sheets-Sheet 9

James O. Farmer
Robert C. Carroll
Claude Tillery
INVENTORS

BY Ahley & Ahley
Attorneys

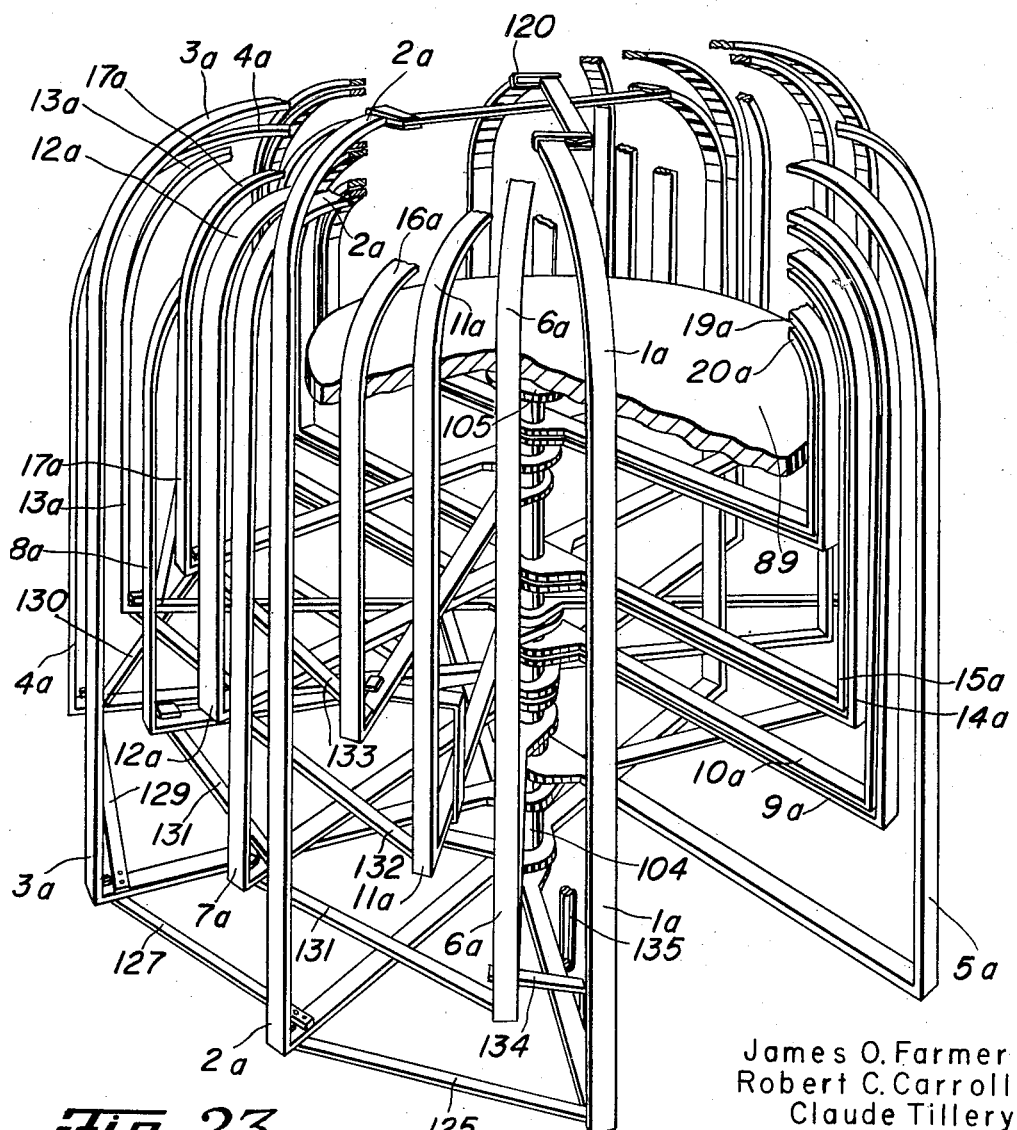

Patented Sept. 19, 1950

2,522,571

UNITED STATES PATENT OFFICE 2,522,571

SYSTEM OF AND MACHINE FOR FABRICATING BASKET WEBS

James O. Farmer, Dallas, Tex., Robert C. Carroll, Wilmington, Calif., and Claude Tillery, Hope, Ark.

Application August 7, 1946, Serial No. 689,066

13 Claims. (Cl. 1—8.1)

This invention relates to new and useful improvements in system of and machines for fabricating basket webs.

Heretofore, basket webs have been made largely by hand. Such a web is made up of a fixed number, usually twenty for a bushel basket, of thin wooden slats approximately two inches to two and one-half inches wide and about one-sixteenth of an inch thick, by approximately thirty-seven to thirty-eight inches long.

When twenty slats are utilized, the bottom five slats are arranged or "fanned" so as to have their center portions in vertical alinement and their outer ends directed radially at equal angles so as to form a ten-pointed star. The next five slats are similarly arranged and superimposed on the bottom five so that the radii of the second five slats quadrisect the angles between the radii of the first five. The third and fourth groups of five slats are similarly fanned and superposed above the lower slats with their radii trisecting the angles between the slats of the first and second groups, so that all twenty slats are equally spaced. After the slats are so arranged, they are suitably fastened together, usually by stapling through the center portion of the slats.

The finished article is an intermediate product in the manufacture of baskets, and is known as a "web." Up to the present time, these webs have been made almost entirely by hand with the aid of a jig to position properly the slats, and, besides requiring considerable personnel, is a relatively slow process. A reasonably competent worker can make only about one a minute.

The present invention contemplates a machine for automatically making basket webs at the rate of five or six or more per minute; a machine which requires only one operator for several machines, so that a considerable saving in labor is effected.

It is, therefore, one object of this invention to provide an improved machine for fabricating basket webs, which is simple and efficient in its operation and requires very little attention on the part of the operator, and which will produce basket webs at a considerable rate.

Another object of the invention is to provide an improved machine for fabricating basket webs to which slats are fed from a magazine or hopper, the hopper being adapted to be refilled without interruption of the operation of the machine so that a continuous output is obtained.

An important object of the invention is to provide an improved machine which automatically receives slats from a plurality of hoppers, positions the slats in the desired arrangement, and secures them together to form a basket web.

Yet another object of the invention is to provide an improved basket web fabricating machine which is adaptable to make basket webs of different sizes and styles.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a side elevation of a machine constructed in accordance with this invention.

Fig. 9 is a side elevation of the stapling device,

Fig. 10 is an enlarged isometric view of the slat hoppers,

Figure 13:
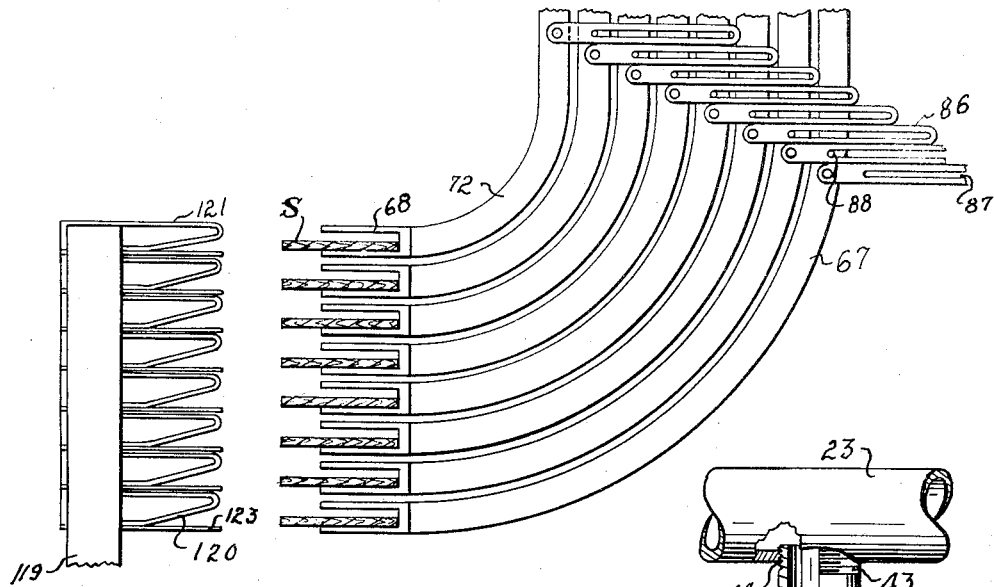
Figure 14:
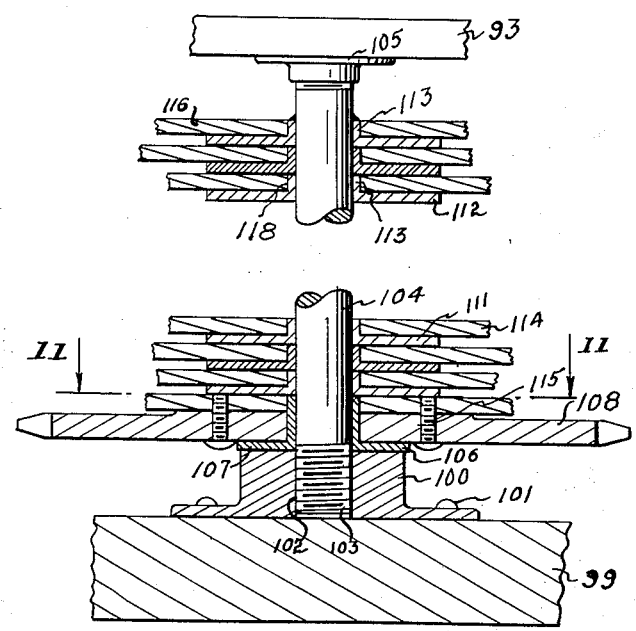
Figure 15:
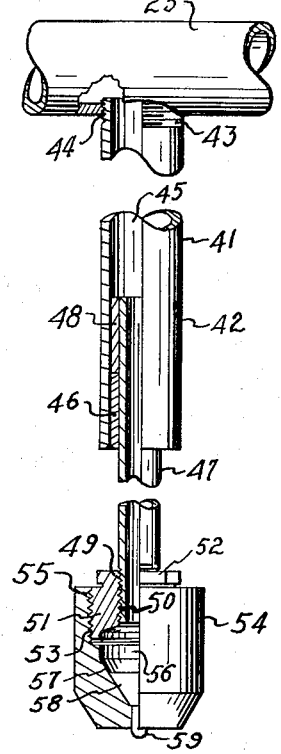
Figure 16:
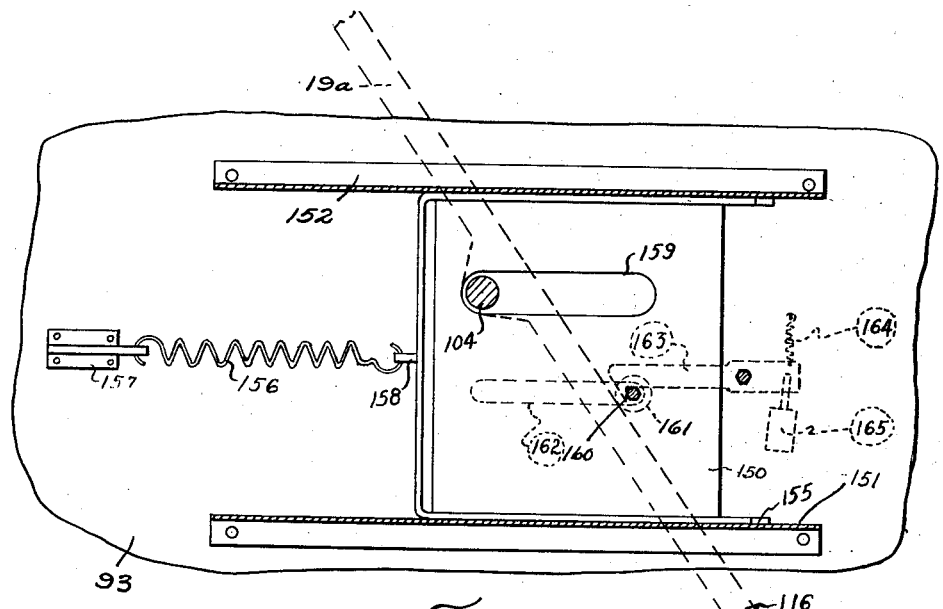
Figure 17:
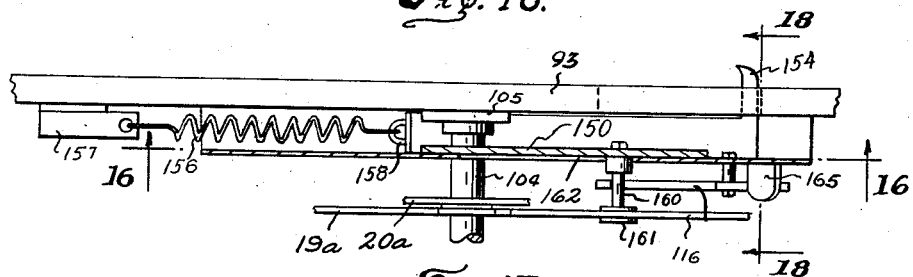

Fig. 11 is an enlarged horizontal, cross-sectional view showing the driving arrangement for the spreader arms, the view being taken upon the line 11—11 of Fig. 14, Fig. 12 is an enlarged isometric view of the upper end of the rear carrying arm, showing the actuating arrangement, Fig. 13 is an enlarged fragmentary view showing the relation between the carrier arms and the spreader arms, Fig. 14 is an enlarged, vertical, sectional view showing the mounting of the spreader arms, Fig. 15 is an enlarged, vertical view, partly in elevation and partly in section, of one of the vacuum pick-up tubes, Fig. 16 is an enlarged, horizontal, cross-sectional view of the stapling table, the view being taken on the line 16—16 of Fig. 17.

Figure 18:
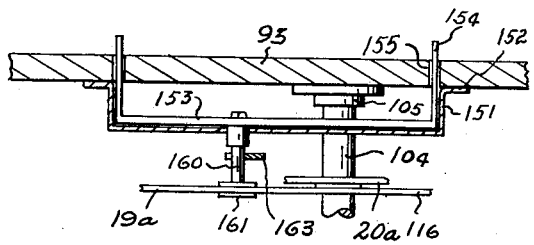
Figure 19:
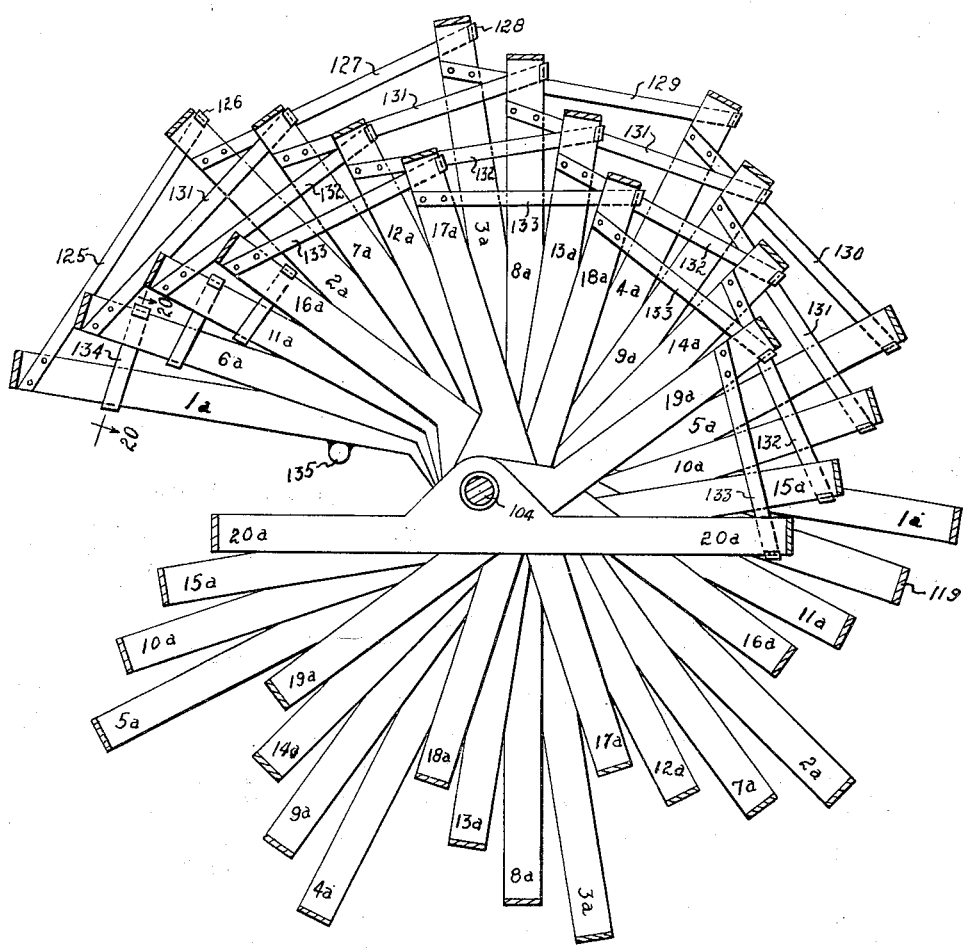
Figure 20:
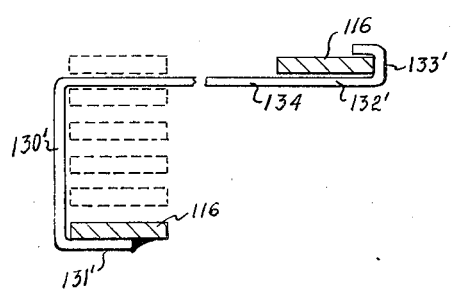
Figure 21:
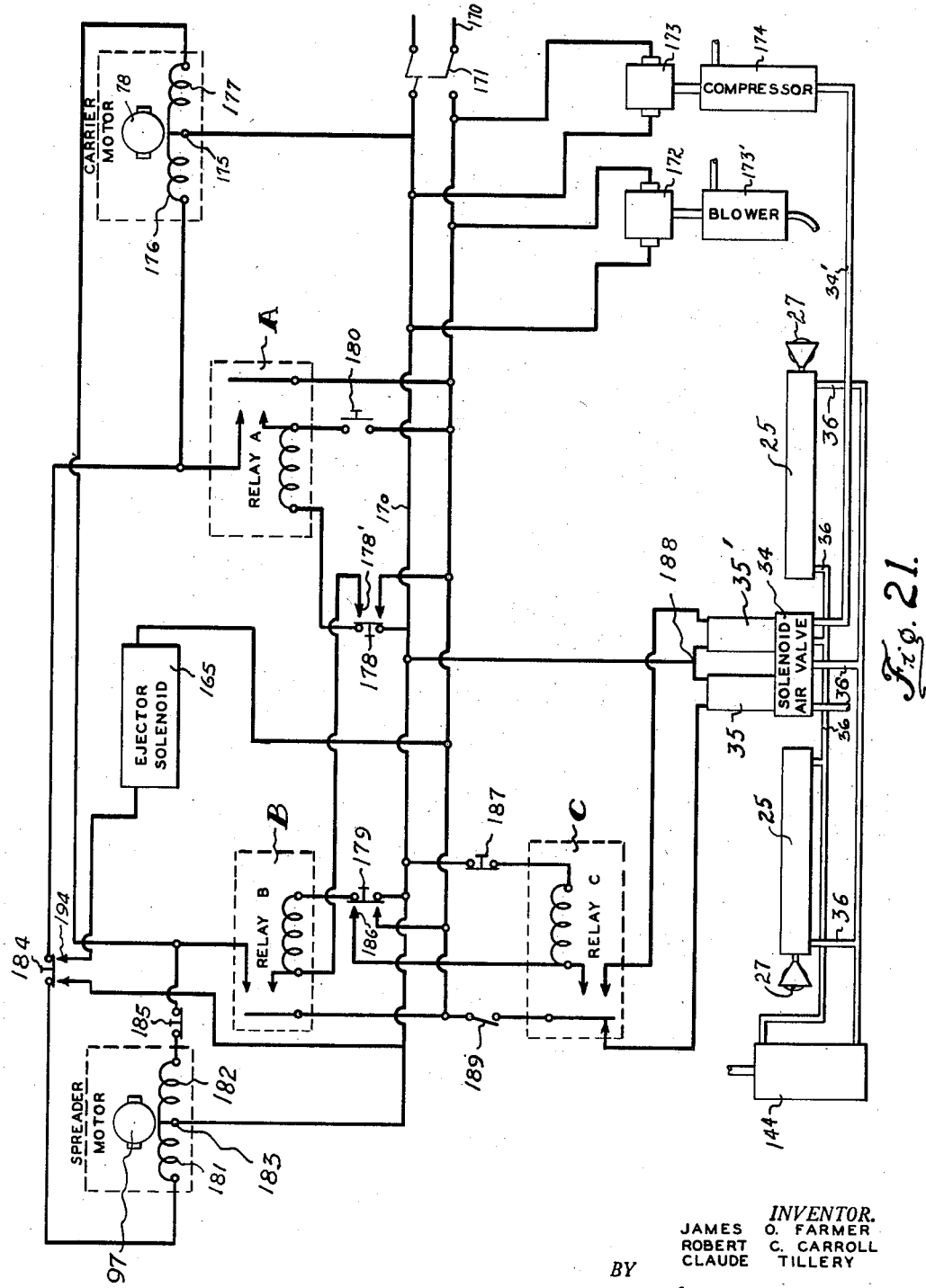
Figure 22:
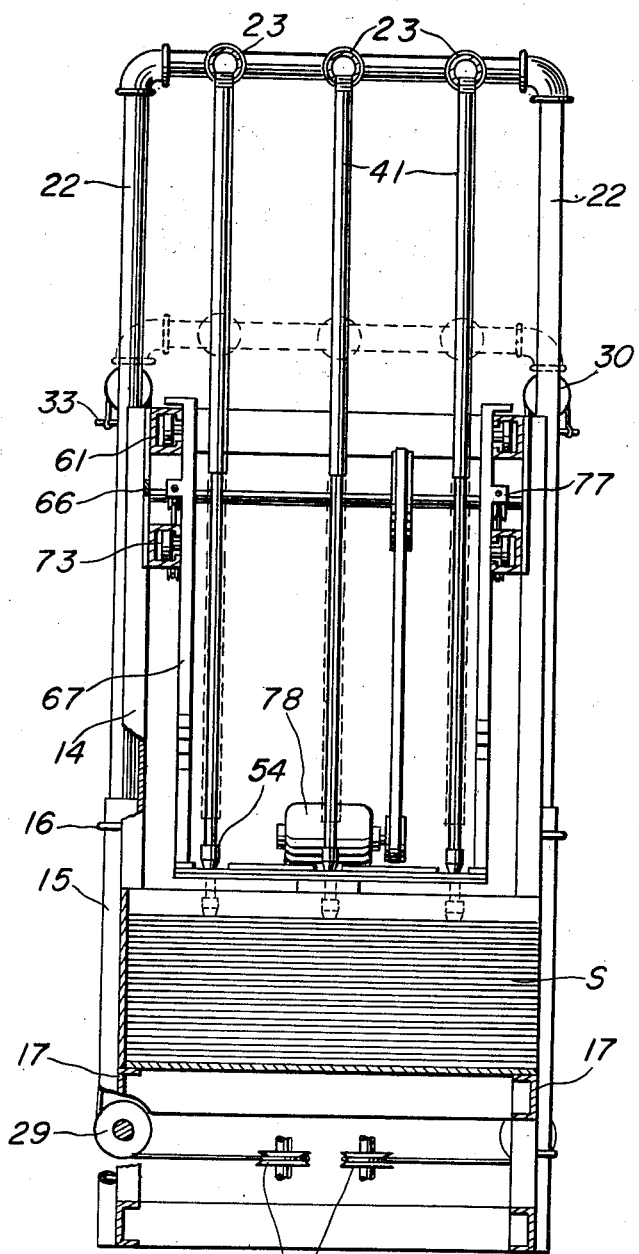

Fig. 17 is an enlarged side elevation of the stapling table showing the ejector mechanism, Fig. 18 is a vertical, cross-sectional view of the stapling table and the ejector mechanism taken upon the line 18—18 of Fig. 17, Fig. 19 is an enlarged plan view of the spreader arms showing them in a spread position, Fig. 20 is an enlarged, vertical, sectional view taken on the line 20—20 of Fig. 19, Fig. 21 is a schematic view showing the wiring diagram and the pneumatic diagram of the machine, Fig. 22 is an enlarged, vertical, cross-sectional view taken upon the line 22—22 of Fig. 1, and Fig. 23 is an enlarged isometric view of the spreader arm mechanism showing the arms in a partially spread position.

In the drawings, the numeral 10 designates an elongate rectangular base having a pair of elongate side members 11 formed of channel steel or the like, joined at their ends by a pair of transverse end members 12. A plurality of transverse cross members 13 serve to brace the base 10 and support elements carried thereby. A post 14, formed of channel steel or of other suitable construction, is rigidly secured to each corner of said base and extends upwardly therefrom several feet. A tubular sleeve 15 is nested within and secured to each of the corner posts 14 by suitable U-bolts 16, and extend upwardly in close engagement with said posts to a point substantially midway between the upper and lower ends of the latter. A beam 17 substantially equal in length to the side members 11, is positioned parallel to and above each of said members, and has its ends secured to the posts 14. A short leg 18 depends from the center of each beam and is secured to the center of the side member 11 therebelow. A stationary frame 19 is thus provided for supporting the various moving and fixed elements of the machine.

A vertically movable carriage or frame 20 is disposed above the base 10, and formed of transverse tubular end members 21, substantially equal in length to the width of the base 10. The end members 21 have a depending tubular leg 22 at either end, which legs telescope the sleeves 15 so as to support the legs in a vertical plane and allow vertical movement thereof. A plurality of elongate tubular headers 23 extend between the end members 21 in a horizontal plane, and are connected thereinto by suitable pipe T's 24, whereby communication is had between the bores of the members 21 and 23 and the legs 22. The lower ends (not shown) of the legs 22 are suitably plugged so that the movable carriage 20 constitutes an air-tight manifold.

For moving the carriage 20 upwardly and downwardly with respect to the stationary frame 19, a pair of pneumatic cylinders 25 are provided. The cylinders are suitably secured upon the cross members 13 of the base 10 below the plane of the beams 17, and extend longitudinally of the base in opposite directions. Any desired arrangement of the cylinders may be made, but in the form shown in the drawings, the cylinders are axially alined with the longitudinal center line of the base so as to have their bottom ends adjacent and their piston rods 26 extending in opposite directions toward either end of the base. The cylinders may be of any desirable or suitable construction or type, and hydraulic cylinders may be utilized, if desired. A sheave 27 is suitably mounted upon the outer end of each of the piston rods.

A pair of sheaves 28 are journaled in a horizontal plane upon each of the end members 12, and spaced apart, one on each side of the center of said members. A similar sheave 29 is journaled in a vertical plane upon each of the corner posts 14 near the lower end thereof, while another sheave 30 is rotatably supported in a vertical plane by a suitable bracket 31 secured to the upper end of each of the corner posts. A flexible cable 32 is secured at each end of the movable carriage 20 and extends from a pin 33 projecting laterally of one of the legs 22 of said carriage, upwardly over the sheave 30 at that corner of the frame, downwardly along the posts 14 and around the lower sheave 29, around one of the sheaves 28 and the sheave 27 on the piston rod, back around the other of the sheaves 28, up around the opposite sheave 29, over the upper sheave 30 on the opposite corner post, and downwardly and secured to the projecting pin 33 on the opposite leg 22 of the carriage 20. Longitudinal movement of the piston rod thus causes uniform movement of each end of the cable to raise and lower one end of the carriage. Since the cylinder, cable, and sheave arrangement is duplicated at each end of the machine, and since the cylinders are powered from the same source of pneumatic pressure, uniform and steady raising and lowering of the carriage is achieved.

For operating the pair of pneumatic cylinders 25, a four-way pneumatic valve 34 is positioned upon the center cross member 13 between the inner or bottom ends of the two cylinders. This valve may be of any usual and desired construction and is of the type adapted to be operated by a pair of electrical solenoids 35 and 35', for upward and downward movement respectively, of the carriage 20. A suitable source of fluid under pressure (shown schematically) is properly connected to the valve 34 by a pipe 34', and the usual connections 36 between the valve and the cylinders are made. The valve may thus be controlled electrically to move the piston rods 26 in either direction, the arrangement of the valve and connections being such as to provide equal and uniform movement of said piston rods so that smooth raising and lowering of the carriage 20 is assured. The electrical connection to the solenoids will be described hereinafter.

A plurality of hoppers 37 are positioned in spaced relation upon the beams 17 and extend transversely of the machine so as to be supported by said beams. The hoppers are formed between thin box-like partitions 38 which are preferably hollow and of sheet metal construction, and are provided along either edge of one side with laterally extending flanges 39 which form a base for the partition and a bottom for the hoppers therebetween. The flanges 39 are equal in length to the width of the frame 10 and are one-half the width of the hoppers, so that abutting flanges of adjacent partitions space the latter a proper distance apart to receive the usual basket slats S. The partitions are equal to or slightly greater in length than the lengths of the ordinary slats so that the latter may be stacked within the hoppers formed between the partitions to be fed subsequently to the gathering mechanism. One end of the hoppers may be closed to provide a stop against which slats may be stacked.

In the illustration shown, twenty of these hoppers are provided since the normal web for a one-bushel basket is made up of twenty slats. Obviously, for baskets requiring different numbers of slats, different numbers of hoppers may be provided. A box-like base member 40 is supported upon the beams 17 at the rearward end of the machine between the last hopper and the rearward corner posts 14.

Figure 2:
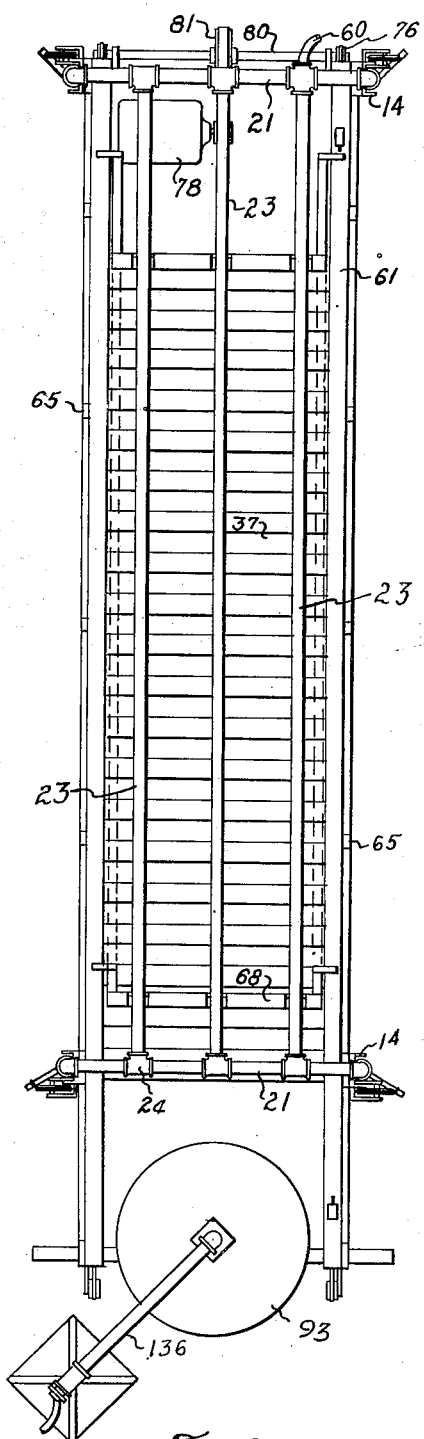
Fig. 2 is a plan view of the machine.
Figure 3:
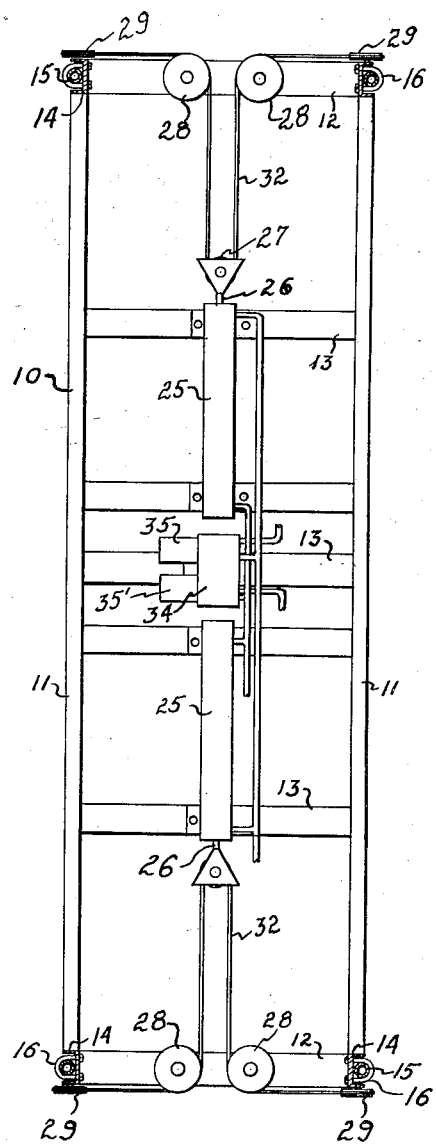
Fig. 3 is a horizontal cross-sectional view of the lower portion of the machine taken upon the line 3—3 of Fig. 1.

One of the headers 23 of the carriage 20 extends along the center line of the carriage, and one is spaced to either side of this center header. As shown in Fig. 2, the side headers are spaced inwardly from the legs 22 and the sides of the carriage. Twenty suction tubes 41 depend vertically from each of the headers 23, the tubes on adjacent headers being alined in rows extending transversely of the carriage. The rows of tubes are spaced along the headers so as to be in vertical alinement with the hoppers, so that as the carriage is lowered, one transverse row of three suction tubes enters each of the hoppers 37, to contact the slats S stacked therein.

Since the heights of the stacks of slats within the hoppers will vary from time to time, each of the suction tubes 41 is made in two tubular sections which telescope. The upper section 42 carries external screw-threads 43 on its upper end which engages within a screw-threaded opening 44 formed in the lower side of one of the headers 23. Thus, the bore 45 of the upper section is in communication with the bore of the header. An internal annular collar 46 is welded, or otherwise suitably secured, in the lower end of the bore 45 and a lower tube section 47 has a sliding fit therein. An external annular collar 48, equal in diameter to the collar 46, is welded, or otherwise secured, to the upper end of the lower section, and has a sliding fit within the bore 45 above the collar 46. As will be seen from Fig. 15 of the drawings, the collars allow telescoping movements between the upper and lower sections, but prevent disengagement of the tubes.

The lower end of the lower tube carries external screw-threads 49 which engage within the screw-threaded bore 50 of an enlarged bushing 51. The bushing is formed with a wrench head 52 on its upper end surrounding the bore 50, and external screw-threads 53. A suction head 54 is provided at its upper end with a screw-threaded box 55 which engages the screw-threads 53. An axial bore 56 extends downwardly from the box 55, and is reduced at its lower end to form a beveled shoulder or valve seat 57. A conical valve 58 rests upon the seat 57 and carries an axially depending finger 59 which projects downwardly through the reduced bore and projects from the lower end of the suction head.

For creating a reduced pressure within the interior of the various elements of the carriage 20, including the headers and the suction tubes, a suitable air pump or fan (shown schematically) has its suction side connected through a suitable hose connection 69 to the right-hand end member 21. A suction is thus exerted through the headers 23 to each of the suction tubes to enable the latter to pick up slats from the hoppers.

The suction exerted is not sufficient to lift the valves 58 from their seats, or to telescope the upper and lower sections of the suction tubes. However, as the carriage 20 is lowered, the fingers 59 contact the slats and raise the valves from their seats. The heads 54 may then engage the slats and obtain a suction grip thereon so as to raise the uppermost slat when the carriage is raised. Each slat is securely held by one transverse row of three suction heads so that the slat cannot sag and is maintained in a horizontal position. Continued downward movement of the carriage after the heads have engaged the slats, serves to telescope the upper and lower sections of the suction tubes whereby the tubes adapt themselves to varying heights of slats in the hoppers.

As the carriage is raised, each transverse row of suction tubes carries one slat. The weight of the slats and of the lower sections causes the tubes to extend their full length. It is pointed out, that the rows of tubes are graduated in length, the shortest tubes being at the left-hand or forward end of the carriage, and the longest tubes at the right-hand or rearward end thereof. Each slat is thus positioned a short distance above the next rearward slat.

Figure 8:
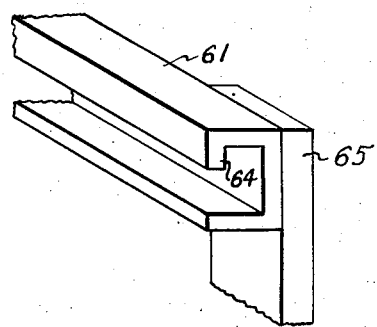
Fig. 8 is an enlarged isometric view of the carrier arm track.
Figure 7:
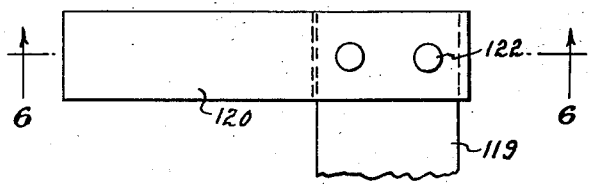
Fig. 7 is an enlarged plan view of one of the spreader fingers.

A pair of double, carrier arm tracks 61 are positioned at the upper ends of the corner posts 14, one double track extending along each side of the stationary frame. The tracks are secured to the inner sides of the posts, and extend from the right-hand posts, as viewed in Fig. 1 of the drawings, to a point some distance beyond the left-hand posts. Each of the dual tracks is provided with an upper rail 62 and a lower rail 63, the rails being in vertical alinement and spaced apart one above the other. Each rail is formed of an elongate extruded or machined section, substantially C-shaped in cross-section and having an inwardly directed lip 64 (Fig. 8) along its outer edge for the purpose of retaining within the rails the rollers to be described hereinafter. Transverse connectors or ties 65 extend between the rails at either end thereof, and at intervals throughout the length of the rails. Suitable angular bracing members 66 extend between upper and lower ends of adjacent ties, so that a strong and rigid track structure is provided.

A plurality of carrier arms 67 have engagement with and are supported by the dual tracks 61. Each arm comprises in general, an elongate gatherer head 68, substantially equal in length to the transverse distance between the two sets of tracks. Each of the heads 68 is in the form of a rectangular tube having its forward side open as well as its ends, and provided with a plurality of notches or cutaway portions 69 in its upper surface, one of said portions being positioned or located at the center of the head and one near each end thereof in vertical alinement with the suction tubes 41. An arm or bracket 70 is secured to each end of each of the gatherer heads 68 outwardly of the cutout portions, the arms being formed with an elongate vertical shank 71 and an arcuate lower section 72 to the lower end of which the head is secured. As will be explained more fully hereinafter, the length and curvature of the arms secured to each of the heads varies to some extent so as to allow the heads to nest one within the other.

A pair of vertically spaced disk-like rollers 73 are secured to the shank 71 of each of the arms 70, the rollers being pivotally secured to the arms and engaging within the upper and lower rails, 62 and 63 respectively. The provision of dual rails and double rollers on each bracket of the carrier arms prevents inclination of the arms with respect to the vertical, and results in a very stable structure. The carrier arms, of course, are free to move longitudinally of the machine along the tracks, but are held against twisting in any direction.

For moving the carrier arms forwardly and rearwardly along the tracks, a cable drive is provided. A pair of sheaves 74 are mounted in vertical alinement upon a pair of suitable brackets 75 secured at both sides of the frame 19 to the forward or left-hand ends of each of the tracks. A similar pair of sheaves 76 are similarly mounted at both sides of the frame at the rearward or right-hand end of each of the tracks, and a pair of continuous flexible cables 77 extend around the sheaves 74 and 76, one of said cables forming a continuous loop about the sheaves carried by one track, and the other forming a similar loop about the opposite track. The sheaves 74 and 76 are mounted in horizontal alinement with each other and so positioned that the upper strands of the cables 77 are disposed substantially midway between the upper and lower rails of the tracks, while the lower lengths of the cables are disposed a short distance below the lower rails.

An electric motor 78 having a suitable pulley 79 secured to its shaft is mounted upon the base member 40 at the rearward end of the frame 19. The uppermost pair of sheaves 76 at the rearward end of the tracks 61 are splined or otherwise suitably connected to a transverse shaft 80 which extends between said sheaves at either side of the machine. An enlarged pulley 81 is suitably splined upon the shaft 80 near its medial portion, and a continuous belt passes around the pulley 81 and the pulley 79 carried by the electric motor 78. This motor is of the reversible type so that the shaft 80 and the sheaves 76 may be driven in either direction to move the cables 77 in either direction.

The rearmost carrier arm 67 is provided at either side with laterally extending ears 83, the ears being formed upon the shanks 71 of the brackets 70 of said arms and positioned midway of the rollers 73. Each of the ears 83 is provided with a central opening 84 and a tubular sleeve 85 extends horizontally in both directions of each of these openings, the sleeves being formed separately of or integrally with the ears and in horizontal alinement with the holes or openings 84. The sleeves 85 receive the cables 77 and are crimped, or swaged, or otherwise suitably secured thereto, so that movement of the cables results in movement of the rearmost arm along the tracks 61. A suitable turnbuckle 85' may be connected into each of the cables to allow adjustment of the cable tension.

Thus the electric motor 78 may be set in motion in a counter-clockwise direction as viewed in Fig. 1, to move the upper lengths of cable to the left and carry the rearmost carrier arm forwardly toward the front portion of a machine; and the motor may be reversed to move this arm toward the rear of the machine.

As set out hereinbefore, the carrier arms are of such lengths and curvatures as to allow the arms to nest one within the other. There are provided twenty of the carrier arms, one to each transverse row of suction tubes. The left-hand, or forward-most, carrier arm is of such length as to place its gatherer head 68 in horizontal alinement with the bottom of the suction heads 54 of the forwardmost row of suction tubes. And each succeeding carrier arm, moving toward the rear of the machine, is of such length as to place its gatherer head in similar alinement with the immediately forward row of suction tubes. Thus, the carrier arms are graduated in length in a fashion complementary to the graduations in length of the rows of suction tubes, and one gatherer head is positioned in horizontal alinement with each row of suction heads.

In addition, the arcuate lower sections 72 of the carrier arm brackets 70, from the front to the rear of the machine, have progressively greater radii of curvature so that each arm may move forwardly under the next forward arm, and the entire set of carrier arms compactly nested. The increasing radius of curvature from the front to the rear of the machine, also causes the arcuate sections to be progressively greater in length, whereby when the arms are nested, the gatherer heads are all disposed in a vertical column and in vertical alinement with one another, as shown in Fig. 13.

With this structure, slats may be picked up from the hoppers and arranged in a vertical column, ready for fanning or spreading into a web. As the carriage 20 is lowered and raised again, twenty slats are picked up by the suction tubes 41, and held in stairstep fashion in alinement with the gatherer heads 68. The motor 78 is then started to move the cables 77 and the rearmost carrier arm 67 forwardly. As the arm moves in such fashion, the slat held by the rearmost row of suction tubes enters the open forward side of the gatherer head 68 carried by the arm, the suction heads 54 of this row of suction tubes registering with the cutaway portions 69 of said gatherer head. Continued forward motion of the arm slides the slat from the grip of the suction heads whereby the former is left lying free within the gatherer head as shown in Fig. 13. Since the slat is greater in length than the gatherer head, the ends of the slat project through the open ends of the head.

Continuing its forward motion, the rearmost arm engages the next forward arm and moves it forward to pick up its slat in a similar manner from the next forward row of suction tubes. And so on, until all twenty carrier arms are completely nested, each carrying a slat in its gatherer head. The vertical column of slats is thus moved toward the left or forward end of the machine to be received by a spreader mechanism to be described hereinafter.

It is pointed out, that as each row of suction tubes is relieved of its load of one slat, the valves 58 drop into engagement with the seats 57 to prevent dissipation of suction through the open lower ends of the suction tubes. Attention is also directed to the fact that, as each carrier arm moves forward, all the carrier arms and all the suction tubes between it and the forward end of the machine are disposed at a higher level, so that there is no obstacle to such forward motion. Obviously, the arms may return to their original positions without encountering such obstacle.

For returning the carrier arms to their original spaced positions to pick up additional slats, the motor 78 is reversed so as to move the upper lengths of cable rearwardly to the right and move the rearmost carrier arm toward the rear of the machine. Each of the carrier arms has a slotted link 86 pivoted to the lower end of its shank 71 above its arcuate section 72. The slot 87 of each link is equal in length to the difference in the distances between adjacent arms when normally spaced and when nested, and receives a laterally projecting pin 88 carried by the shank of the next rearward carrier arm. The pivot points of the links are arranged in stairstep fashion from the front to the rear of the group of carrier arms, each next rearward link being pivoted at a point a short distance below the horizontal plane in which the next forward link is pivoted, said distance being substantially equal to the width of one of the links. Thus, as shown in Fig. 13, when the arms are nested and the pins 88 are disposed within the forward portions of the slots 87, each link may remain in a horizontal position and yet clear the rearward links.

As the cable carries the rearmost arm toward the rear of the machine, the pins 88 of each succeeding forward arm are moved to the rear portion of the slots 87 so that the links function to space the arms properly and move them to their proper positions to receive additional slats.

The carrier arms and suction tubes thus cooperate to deliver vertical stacks of twenty slats each to the forward end of the machine. In this connection, it is pointed out that throughout this description the number of slats being handled at one time has been set at twenty for the purpose of clarity and because this is the normal number of slats used in a one-bushel basket. However, any desired number or size of slats may be employed, and with the use of selected hoppers in the specific machine herein being described, smaller numbers of slats may be utilized. Obviously, the specific embodiment may be designed for a variety of purposes, for different numbers of slats and for different types of slats. The invention is not limited to any of these specific details.

A spreader unit 89 is positioned at the left-hand or forward end of the machine beneath the projecting forward ends of the tracks 61. The unit includes a rectangular, horizontal base plate 90 having a pair of laterally spaced, upstanding legs 91 secured thereto. Suitable, triangular braces 92 are pivoted at either side of the legs to strengthen the latter. A circular stapling table 93 which may be of wooden or metallic structure, is supported upon the upper ends of the legs, the table being slightly less in diameter than the length of one of the gatherer heads 68.

A pair of short upstanding posts 94 are secured to the base plate 90, one adjacent each of the legs 91 and spaced therefrom the width of the braces 92. A horizontal brace 95 extends from the upper end of each of the posts to the adjacent leg for steadying the posts, and a pair of vertically spaced supports 96 extend horizontally between the posts, being suitably secured thereto as by welding. A reversible electric motor 97 is mounted in a vertical position upon the supports 96 and has its shaft 98 directed upwardly. A horizontal bearing beam 99 extends transversely of the spreader unit between the legs 91, the ends of the beam being secured to the latter. The beam is positioned slightly below the medial portion of the legs.

A flanged collar 100 is mounted upon the upper side of the bearing beam 99, being secured at the center of the beam by bolts 101. The collar is formed with an axial screw-threaded bore 102 which receives the screw-threaded lower end 103 of a vertical axle 104. The upper end of the axle is also screw-threaded and engages within a screw-threaded, flanged collar 105 secured to the underside of the table 93 and in the center thereof. A bearing bushing 106 has a sliding fit on the axle 104, the bushing being formed with an external annular flange 107 at its lower end which engages and rests upon the upper end of the collar 100. A toothed sprocket wheel 108 is carried by the bushing 106, and is connected by a sprocket chain 109 with a smaller toothed sprocket wheel 110 splined, or otherwise secured to the motor shaft 98.

A plurality of bearing bushings 111 are disposed upon the axle 104 in superposed fashion, each resting on the bushing below, and have a sliding fit with the axle. The bushings are formed with wide annular flanges 112 at their lower ends and relatively short upstanding necks 113 which embrace the axle. With exception of the uppermost bushing which is welded or otherwise secured to the axle 104, the bushings therebelow are free to rotate with respect to each other, to the axle, and to the lowermost bushing 106, the entire column of bushings 111 resting upon the upper end of said lower bushing. In this instance, twenty bushings have been shown, however, as pointed out hereinbefore, the invention is not to be limited to a specific number.

A spreader arm 114 is disposed upon each of the bushings 111, and also a similar arm disposed upon the lower bushing 106, the latter arm being secured to the sprocket 108 by suitable bolts 115 so as to revolve therewith. Each arm includes an elongate horizontal lower section or bar 116 which is positioned beneath the table 93 and carries at its center an enlarged or widened section 117. Openings 118, which are offset with respect to the longitudinal axes of the bars 116, are formed in the enlarged sections to receive the necks 113 of the bushings 111, said necks being substantially equal in height to the thickness of the bars 116. The offset openings cause the arms to revolve in an eccentric about the axle, the function of which mounting being explained hereinafter.

Figure 4:
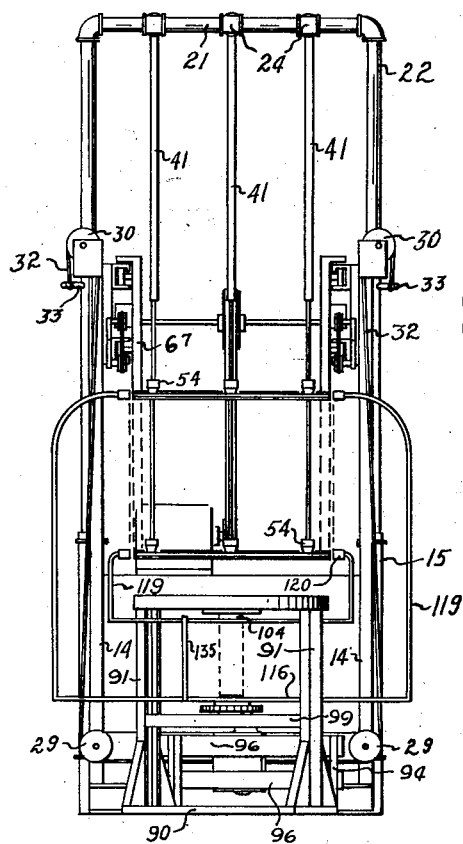
Fig. 4 is an end elevation of the machine taken from the left-hand end thereof.
Figure 5:
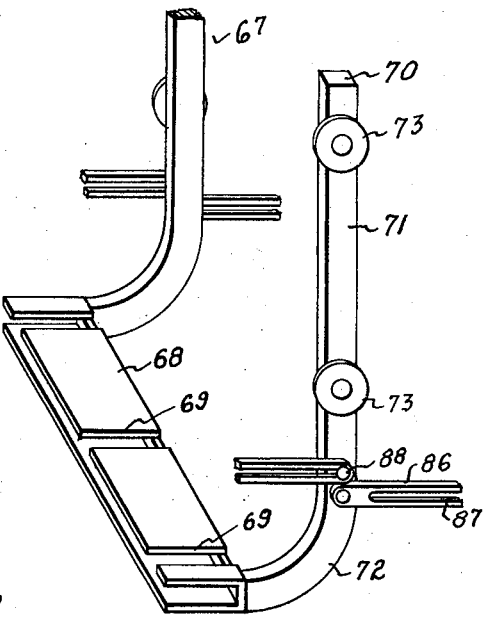
Fig. 5 is an enlarged view in perspective of one of the carrier arms.
Figure 6:
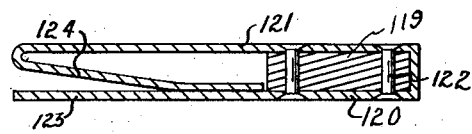
Fig. 6 is an enlarged sectional view of one of the spreader fingers taken upon the line 6—6 of Fig. 7.

The bars are graduated in length as shown in Figs. 4, 19 and 22, the uppermost bar being slightly greater in length than the diameter of the table 93. Each bar is formed with an upright 119 at either end, the uprights extending upwardly above the stapling table. Therefore, each next lower bar beginning with the uppermost bar, is enough longer than the next bar above to allow the uprights of the lower bar to clear and be positioned outwardly in a radial direction of the uprights of said next upper bar, as shown in Fig. 23. Thus, when the arms are nested, as shown in Fig. 1, the uprights are in a horizontal row.

The uprights are graduated in length, the uppermost bar having the shortest uprights, and the lowest bar having the longest. The upper end of each bar is curved inwardly, the radii of curvature being such as to allow the arms to pivot or revolve about the axle 104 without coming in contact with adjacent arms. The curved upper sections of the arms are also graduated in length, whereby, when the arms are nested the inner ends thereof are in vertical alinement with each other, and in horizontal alinement with the gatherer heads 68 of the carrier arms 67. Thus, each bar carries two uprights which extend upwardly above the stapling table and curve inwardly. The incurving ends of each pair of uprights are in horizontal alinement with each other and with the gatherer head of one of the carrier arms.

A clip or gripper 120 is secured to the upper extremity of each of the uprights 119. The grippers are directed laterally of the uprights so as to project toward the frame 19 when the spreader arms are nested as in Figs. 1 and 4. Since the upper ends of the uprights are in vertical alinement, the grippers are also in vertical alinement.

Each gripper comprises a flat, resilient, metallic strap 121 bent in a U-shaped section having unequal legs, so as to engage the top, bottom and one side of the upright, being secured thereto by suitable means such as rivets 122. The legs project laterally of the upright to provide gripper fingers 123, and the longer leg is bent downwardly and doubled back to form a resilient clip or latch 124 which is disposed between the fingers. A basket slat may thus enter the gripper edgewise by passing between the fingers of the latter. The grippers are relatively small, and only one edge of the slat enters as shown in Fig. 13. However, the slat is gripped and securely held between the latch 124 and the lower finger 123.

With this structure, as one set of twenty slats is moved to the front of the machine by the carrier arms as described hereinbefore, provision is made for receiving and removing the slats from the carrier arms by the spreader arms. As the carrier arms move forwardly to the forward ends of the tracks 61, the end portions of the slats projecting through the open ends of the gatherer heads, enter and are engaged by the grippers 120. Upon reversal of the motor 78, the carrier arms 67 are allowed to move rearwardly, as will be explained. As the carrier arms move rearwardly, the slats are held by the grippers and thus removed from within the gatherer heads. In this manner, the vertical column of slats is transferred from the carrier arms which are separable laterally, to the spreader arms which are separable rotationally.

As pointed out hereinbefore, the openings 118 in the bars 116 are offset. These openings are offset from the spreader arms 114 in the same direction as the grippers so as to be in vertical alinement with the geometric centers of the slats held by the grippers. Thus, as the spreader arms revolve, the slats held thereby are rotated about their own geometric centers and misalining of the slats is prevented.

To illustrate the spreading or fanning of the slats into the positions required for a basket web, the spreader arms will be assigned the numbers 1a to 20a, the lowermost arm which is driven by the sprocket wheel 108, being 1a and the succeeding arms progressing upwardly being numbered in rotation, the top arm being 20a. It is pointed out, that the lowest arm 1a receives the uppermost slat carried by the carrier arms due to the fact that the uprights 119 of said lowest arm are the longest, while the top spreader arm receives the lowest slat in the vertical stack delivered by the carrier arms.

As set out in the preamble hereto, the slats are spread in groups of five, each group being offset from the groups below so that the entire twenty slats are evenly spaced. This means there must be approximately 36 degrees between adjacent slats of one group and 9 degrees between adjacent slats in the completed web. The bar 116, shown in Fig. 23, of the lowest arm 1a has secured thereto at one end a laterally projecting strap 125 having an upwardly directed hook 126 formed at its outer extremity. As shown in Fig. 19, the strap is disposed at an angle with respect to the bar and is adapted to engage its hook 126 with the bar 116 of the spreader arm 2a immediately above. The strap is of such length as to space arms 1a and 2a 36 degrees apart, so that as arm 1a is revolved by the motor 97, the arm 2a is revolved therewith but trails by 36 degrees. Similarly, arm 2a carries a strap 127 secured to its bar 116, said strap having a hook 128 for engaging the bar of the arm 3a and revolving said arm with the arms 1a and 2a but 36 degrees behind arm 2a. Arms 4a and 5a are similarly revolved by straps 129 and 130 carried by the arms 3a and 4a respectively, so that the lower five arms and the slats carried thereby, are spread into a ten-pointed star, each arm lagging 36 degrees behind the next lower arm. This rotation is accomplished by motive power supplied to arm 1a only.

The next five arms 6a through 10a are adapted to be spread through 360 degrees by similar straps 131 carried by the arms 6a through 9a, while the upper two groups of five arms each, 11a through 15a, and 16a through 20a, carry straps 132 and 133 respectively, for spreading these latter groups through 360 degrees. Since arm 1a is the only powered arm, means must be furnished for transmitting power to the arms 6a, 11a, and 16a to allow these arms to revolve the upper three groups of arms. Such means is provided by suitable brackets 134, one of which is shown in Fig. 20. Each bracket has a vertical shank 130' formed with a laterally extending ear 131' at its lower end. The ear engages beneath the bar 116 upon which the bracket is carried and is welded or otherwise secured thereto. An arm 132' extends laterally of the shank at its upper end, the shank being of such length as to position the arm between the fourth and fifth bars above the bar which carries the bracket. An upstanding lip 133' is provided on the outer end of the arm 132' so as to engage the next upper, or fifth bar 116. One of the brackets 134 is carried by each of the arms 1a, 6a, and 11a, and each bracket engages the next arm in this series, the bracket on arm 11a engaging arm 16a. The arms 132' of the brackets are of such length as to space the arms at 9 degree intervals. In this manner, movement of the arm 1a fans or spreads the entire twenty arms and the slats carried thereby into an evenly spaced circular fan or web. The securing of the arm 20a to the axle 104 prevents overtravel of the other arms and insuring spreading of the slats into an evenly-spaced, properly positioned web.

Following removal of the slats from the spreader arms, an operation to be described hereinafter, the arms must be returned to a nested position to receive another set of slats from the carrier arms. To accomplish this, an upright rod 135 is welded, or otherwise secured, to one edge of the horizontal bar 116 of the arm 1a. The rod 135 is secured near the center of the arm on the leading edge thereof as said arm moves into a spread position, and extends upwardly to a point above the bar 116 of the top arm 20a and below the stapling table 93. Being on the leading edge of arm 1a, the rod is inoperative as the arms revolve into a spread position. However, when the motor 97 is reversed so as to revolve the arm 1a in the opposite direction, the rod engages the bars 116 of each of the arms and revolves them into an alined, nested position, as shown in Figs. 1 and 4.

For stapling or fastening the fanned web of slats together, a stapler unit 136 is provided. The stapler unit is positioned adjacent and to one side of the stapling table 93, as shown in Fig. 2, and includes an upright cylinder 137 mounted upon a suitable base 138. An elongate piston 139 is reciprocal within the cylinder and carries a head 140 at its upper end. An arm 141, formed of pipe or other suitable material, extends laterally of the head 140 to a point in vertical alinement with the center of the stapling table 93, and a stapler 142 depends therefrom on an elongate shank 143. The piston 139 is normally raised so that the stapler does not obstruct the carrier arms or the spreader arms.

The stapler may be of any desirable or suitable type or construction, and is adapted to set one or more staples when actuated. It may be operable through downward motion or contact, or may be actuated by other means such as electrical or fluid impulse. Other means may be utilized to secure the slats together, the invention not being limited to stapling. This mode of fastening is illustrated and described since it is the most widely used.

A pneumatic cylinder 144 is secured to the base 138, and extends upwardly therefrom contiguous to the cylinder 137. A lug 145 projects laterally of the head 140 on the opposite side from the arm 141, and the piston rod 146 of the pneumatic cylinder is formed with an eye 147 at its upper end which receives the lug. Movement of the piston rod is thus transmitted to the piston 139 and the stapler 142. Suitable pipes 148 are connected from the pneumatic cylinder 144 to the valve 34 for actuating the former. It is pointed out, that hydraulic or other means may be utilized for movement of the stapler.

In the operation of the stapler unit, the pneumatic cylinder is actuated at the same time as the pneumatic cylinders 25, so that the stapler 142 moves downwardly with the carriage 20. As the stapler contacts the basket slats, spread in a fan by the spreader arms, the slats are bowed so as to be pulled longitudinally from the grippers 120. The pull thus exerted is longitudinal of the slats so that the stresses incurred and the abrasive action caused by the fingers 123, is directed along the grain of the slats and not across the grain. Thus, damage to the slats is prevented.

The slats are pressed downwardly in this manner, being removed from the spreader arms at the same time, into a compact mass between the stapler and the stapling table 93. At the bottom of its stroke, the stapler is actuated to set a plurality of staples (not shown) in the web of slats, thereby securely fastening the latter into a unit. The stapler is then raised into an inoperative position, leaving the finished web lying on the stapling table.

An ejector mechanism 150 for removing the finished web from the stapling table is shown in Figs. 16, 17 and 18. A shallow tray 151 having lateral flanges 152 is secured to the underside of the stapling table by said flanges, said tray being positioned slightly off center with respect to the table. The tray runs from front to rear of the table and supports an ejector slide 153. The slide is in the form of a shallow box having its top and rearward side open and being provided with a pair of upstanding, hooked, ejector fingers 154. The fingers are formed integrally with the slide, and one is disposed at either side of the latter and at the rearward end thereof. A pair of elongate slots 155 are provided in the stapling table and the ejector fingers project upwardly a short distance therethrough so as to have their upper ends disposed above the upper surface of the table. A coiled spring 156 has one end secured to a bracket 157 carried on the underside of the table, and the other engaging an eye 158 mounted on the forward side of the ejector slide, so that said spring constantly urges the slide forwardly within the tray 151. An elongate slot 159 formed in the slide receives the spreader arm axle 104 and allows the slide to reciprocate without contacting said axle.

A stub axle 160 having a roller 161 journalled at its lower end, is secured to the ejector slide 153 and depends vertically therefrom. An elongate slot 162 is provided in the tray to receive the axle which is of such length as to support the roller 161 in horizontal alinement with the bar 116 of the spreader arm 19a. A latch 163 is pivoted to the underside of the tray and adapted to engage the stub axle when the slide is in its rearmost position. A coiled spring 164 is connected to the latch so as to urge the latter into latching position, while a suitable electrical solenoid 165 is so connected to the latch as to swing it to an unlatching position, when actuated.

The ejector is cocked by the revolving of the spreader arms into a spread position. The bar 116 of arm 19a, as the arm revolves, engages the roller 161 and forces the ejector slide rearwardly against the tension of the spring 156 until the latch 163 is engaged by the axle 160. At this point, the arm is at the end of its revolving movement, but the ejector slide is held by the latch. After the web has been stapled and the spreader arms returned to their nested position, the solenoid 165 is energized, releasing the latch and allowing the spring 156 to snap the ejector slide forwardly under considerable impetus. As this occurs, the ejector fingers engage the finished basket web lying on the stapling table, and impart considerable momentum thereto so that the mat is forceably projected laterally from the table. A suitable receptacle (not shown) or conveyor (not shown) may be provided to receive the projected web.

To make provision for automatic and continuous operation of the machine, a plurality of control switches and relays are utilized. The interrelation of this electrical system and the pneumatic system is shown in Fig. 21 of the drawings.

Power is supplied to the machine through a pair of electric busses or mains 170, controlled by a double-pole master switch 171. Power for the blower motor 172 and the compressor motor 173 is taken directly from said mains. The blower motor drives the air blower 173' which provides a reduced pressure within the suction tubes 41 and the compressor motor drives an air compressor or hydraulic pump 174 to furnish fluid under pressure for actuation of the pneumatic cylinders 25 and 144.

The carrier arm drive motor 78 has the common end 175 of its double field winding connected to one of the mains. The opposite terminal of the motor's forward field coils 176 is connected to one contact of a double contact, normally open relay A. The opposite terminal of the motor reverse field coils 177 is connected to one contact of a double contact, normally open relay B. Both relays A and B are of the self-energizing type, one contact being connected to the coil of each relay, the opposite ends of the coils being connected through normally closed, double-throw switches 178 and 179 respectively, to one main, and the armatures of the relays being connected to the other main. The coil of relay A has the terminal which is connected to one contact, also connected through a normally-open, momentary contact switch 180 to the same main to which the armature of relay A is connected. The coil of relay B has its similar terminal connected through a pair of open contacts 178' to the same main, the contacts 178' being a part of switch 178 and adapted to be closed by the opening of said switch.

The reversible motor 97 for the spreader arms also has a double field winding, one coil for nesting the arms being designated by the numeral 181, and the other reversing coil, for spreading the arms, by the numeral 182. The common terminal 183 of the coils are connected to the same main as terminal 175. The opposite terminal of the nesting coil 181 is connected through a normally closed, momentary contact switch 184 to the forward coil of motor 78, while the spreading coil 182 is connected through a similar switch 185 to the reverse coil 177 of said motor.

The normally open contacts 186 of switch 179 are connected between one main and one terminal of the coil of a third relay C and to one normally open contact thereof, the opposite terminal of the coil being connected through a normally-closed, momentary contact switch 187 to the other main. The relay C has three contacts, two normally open and one normally closed. The other normally open contact is connected to one side of the lowering solenoid 35' which controls in part the valve 34 and the pneumatic cylinders 25. The normally closed contact of the relay is connected to one side of the raising solenoid 35, and the common terminal 188 between the two solenoids is connected to the same main as switch 187. The armature of relay C is connected through a manual start-stop switch 189 to the other main.

Relays A, B and C as well as the blower and compressor may be mounted in any convenient location on or near the machine, and hence are shown only in the schematic diagram in Fig. 20. However, the various switches, with the exception of the master switch 171 and the start-stop switch 189, depend for operation on various moving parts of the machine, and are located in the drawings.

Switch 178 is mounted upon the forward end of one of the upper rails 62 and is adapted to be engaged by an upstanding lug 190 formed on the upper end of one of the shanks 71 of the forwardmost carrier arm 70. The switch is so positioned as to be engaged when the carrier arms have reached their most forward position. As part of this structure, a coiled spring 191 is connected between a point on the forwardmost carrier arm midway of the rails 62 and 63 and one of the rearward ties 65 to retract the arms when the motor 78 is reversed, and provide clearance for the revolving of the spreader arms. If desired, a similar spring (not shown) may be connected to the opposite shank of this arm.

Switch 179 is mounted at the rear of the same rail 62 and adapted to be engaged by an upstanding lug 192 provided for this purpose upon the upper end of the rearmost carrier arm. This switch is actuated when the carrier arms reach their spaced positions. The switch 180 is carried at the top of one corner post 14 and engaged by a pin 193 projecting from the leg 22 of the frame 20 at that corner, while the switch 187 is mounted at the top of the sleeve 15 near the center of the corner post to be operated by the pin 193 when the carriage 20 is in a lowered position.

The switches 184 and 185 are secured to one leg 91 of the spreader unit and face laterally in opposite directions. Switch 184 is the upper switch and is engaged by the bar 116 of one of the spreader arms when the arms are nested. Switch 185 projects from the opposite side of the leg 91 and is engaged by the bar 116 of the bottom spreader arm when the arms are fully spread or fanned.

In the operation of the machine, the master switch 171 is closed which places electric power on the mains 170 and starts the motors 172 and 173, thereby providing a suction within the headers 23 and the suction tubes 41, and fluid pressure to the pneumatic cylinders. These motors operate continuously. Next, the start-stop switch 189 is closed, energizing the solenoid 35 to operate the pneumatic cylinders 25 and raise the carriage 20. At the same time, the pneumatic cylinder 144 is actuated to raise the stapler 142. As the frame reaches its upper position, the pin 193 operates the switch 180 to energize the coil of the relay A and close the contacts. Once the relay is closed, the circuit through the switch 178, the relay coil, and the armature holds it closed. This closes the circuit to the forward coil 176 of carrier motor 78 and to the nesting coil 181 of the spreader motor 97 to move the carrier arms forwardly to pick up slats from the suction tubes, and to revolve the spreader arms to a nested position. When the spreader arms are nested, switch 184 is opened, breaking the circuit to the motor 97 and stopping the latter.

The carrier arms upon reaching their forwardmost point, urge the slats they carry into engagement with the grippers 120 of the spreader arms as set out hereinbefore, and at the same time, the lug 190 engages the switch 178, opening the circuit through the coil of the relay A and allowing the relay to open and stop the carrier motor 78. At the same time contacts 178' in the switch 178 are closed to energize relay B. As soon as relay B closes, it is self-energizing through the armature, the relay coil, and switch 179. Closing of the latter relay closes the circuit to the spreading coil 182 of the spreader motor to fan or spread the carrier arms and close switch 184, and to the reversing coil 177 of the carrier motor to retract the carrier arms into a spaced position. At this point, the spring 191 functions to speed said retraction, and if desired, a time delay mechanism (not shown) may be provided to delay revolving of the spreader arms until such time as the carrier arms have cleared. As the carrier arms reverse, switch 178 is released to its normally closed position.

Upon the spreader reaching a spread position, the lowest spreader arm contacts and opens the switch 185 stopping the spreader motor, and when the carrier arms have reached their spaced position, the lug 192 engages the switch 179, breaking the circuit through the coil of the relay B to open the latter and stop the carrier motor. As the switch 179 opens, it closes the coil circuit of relay C, closing the latter relay. This opens the circuit to the raising solenoid 35 and closes the circuit to the lowering solenoid 35' which operates the valve 34 to actuate the cylinders 25 and 144, and lower the carriage 20 so that the suction tubes may pick up another set of slats. At the same time the stapler 142 is lowered to fasten the spread slats, held by the spreader arms, into a completed web. As the frame reaches its lower position, the pin 193 engages and opens the switch 187, thus breaking the coil circuit to relay C and allowing the relay to open. The circuit to solenoid 35' is thereby opened and the circuit to solenoid 35 closed to actuate the valve 34 and cause the cylinders 25 and 144 to function to raise the carriage and the stapler 142. As the carriage reaches its upper position, the pin 193 again engages and closes the switch 180, again energizing the relay A and causing the sequence of operation to repeat. It is pointed out, that the solenoid 165 of the ejector unit 150 may be connected into the system at any suitable point. As shown in Fig. 21, the switch 184 is provided with normally open contacts 194 adapted to be closed when the switch is opened to stop the spreader motor 97 as the spreader arms are returned to their nested position. The solenoid 165 is connected in series with the contacts 194 across the two mains 170, so that as the carrier arms meet, the ejector is released to remove the finished basket web from the stapling table. As the arms again spread, the solenoid 165 is de-energized to allow the ejector to be cocked.

Thus, complete and continuous automatic operation of the machine is provided. No attention is required after starting except to fill the hoppers 37 with slats from time to time. These hoppers will normally hold about thirty minutes' supply of slats, so that one operator can keep several machines running at one time.

The electric motors utilized are preferably magnetic-braked, and provision is made in the various switches to permit slight overrunning of the motors.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A basket web fabricating machine including, a supporting frame, a plurality of hoppers carried by the frame adapted to contain basket slats, a conveyor movable over the hoppers having stepped gatherers, means for elevating slats from the hoppers into the paths of the gatherers, means for moving the conveyor to cause the gatherers to engage and convey the slats carried by the elevating means, a receiver at one end of the conveyor for collecting the slats from the gatherers, and means for spreading the receiver to fan the collected slats into a basket web.

2. In combination with means for gathering a plurality of basket slats, a spreader unit including, a support, an upright axle carried by the support, a plurality of rotatable members mounted on the axle each having means for receiving and holding a slat from the gathering means, means for rotating one of said members, co-acting means carried by certain of the rotatable members for engaging other of the members and responsive to the movement of one of said members to rotate the remaining members and spread the members into spaced radial relationship whereby the slats carried by the members are spread into a web, and a stapler co-acting with the spreader unit.

3. A basket web fabricating machine including, a supporting frame, a movable frame carried by the supporting frame, a horizontal conveyor carried by the supporting frame, gatherers depending from the conveyor in stepped order, a plurality of suction heads carried by the movable frame and depending therefrom in stepped order in alinement with the gatherers, the suction heads being movable vertically of the gatherers and the gatherers horizontally of the suction heads, slat containing hoppers below the gatherers in alinement with the suction heads, a spreader unit at one end of the conveyor having means for receiving and holding slats from the gatherers and spreading the slats into a basket web, and a support for the spreader unit.

4. A basket web fabricating machine including, a supporting frame, a movable frame carried by the supporting frame, a horizontal conveyor carried by the supporting frame, gatherers depending from the conveyor in stepped order, a plurality of suction tubes formed of telescoping sections depending from the movable frame in stepped order, slat containing hoppers carried by the supporting frame below the gatherers in alinement with the suction tubes, the movable frame being adapted to be lowered so as to lower the suction tubes into the hoppers to pick up basket slats, the tubes being adapted to telescope in accordance with the height of the slats in the hoppers, valve means on the lower end of each of the tubes for preventing loss of suction when the tubes are not engaging a slat, gatherer heads on the gatherers in alinement with the lower ends of the suction tubes for receiving slats from the suction tubes when the gatherers are moved horizontally by the conveyor, a spreader unit at one end of the conveyor having means for receiving and holding slats from the gatherers and spreading the slats into a basket web, and a support for the spreader unit.

5. The combination with means for gathering a plurality of basket slats including, a supporting frame, a movable frame carried by the supporting frame, a horizontal conveyor carried by the supporting frame, gatherers depending from the conveyor in stepped order, a plurality of suction tubes formed of telescoping sections depending from the movable frame in stepped order, slat containing hoppers carried by the supporting frame below the gatherers in alinement with the suction tubes, the movable frame being adapted to be lowered so as to lower the suction tubes into the hoppers to pick up basket slats, the tubes being adapted to telescope in accordance with the height of the slats in the hoppers, valve means on the lower end of each of the tubes for preventing loss of suction when the tubes are not engaging a slat, gatherer heads on the gatherers in horizontal alinement with the lower ends of the suction tubes for receiving slats from the suction tubes when the gatherers are moved horizontally by the conveyor, of a spreader unit at one end of the conveyor including, a support an upright axle carried by the support, a plurality of rotatable members mounted on the axle each having means for receiving and holding a slat from the gathering means, means for rotating one of said members, means carried by certain of the members engaging other of the members and rotating the latter member with the former members in staggered relationship to spread the members into spaced angular relationship, whereby the slats carried by the members are fanned into a basket web and a stapler co-acting with the spreader unit.

6. A basket web fabricating machine including, a supporting frame, a plurality of hoppers carried by the frame adapted to receive stacks of basket slats, a conveyor carried by the frame and overlying the hoppers having means for picking up a slat from each hopper and conveying the picked up slats to one end of the frame, a plurality of slat-receiving supporting elements positioned at the end of the machine receiving the slats from the conveyor, means for rotating the supporting elements to rotate each slat to its proper web position, and means for fastening the central portions of the properly positioned slats together to form a basket web.

7. A basket web fabricating machine including, a supporting frame, means on the frame for supporting basket slats in parallel horizontally-stepped order, a conveyor carried by the frame, gatherers on the conveyor horizontally stepped for receiving the slats from the supporting means, vertically alined rotatable members at one end of the conveyor for receiving the slats from the gatherers and supporting the slats in a vertical column, and means for rotating said members individually with their slats to fan the slats into a basket web.

8. A basket web fabricating machine including, a supporting frame, a conveyor carried by the frame, a plurality of successive hoppers disposed beneath the conveyor adapted to contain basket slats, a plurality of lifting elements carried by the frame spaced in vertical alinement with the hoppers to remove slats therefrom, gatherers on the conveyor alined with the lifting elements for successively removing slats from said elements and supporting them in superposed order, rotatable members at one end of the conveyor for receiving the slats from the gatherers and fanning the slats into a basket web, and a stapler for fastening the central portions of the fanned slats together.

9. In combination with means for gathering and supporting a plurality of basket slats, a receiver having a plurality of rotatable slat-receiving elements rotating in spaced parallel planes, and means for rotating said elements through different angles to fan the slats into a basket web.

10. In combination with means for gathering and supporting a plurality of basket slats with their flat sides parallel, a receiver having a plurality of rotatable slat-receiving elements in parallel arrangement to receive the parallel basket slats, said elements rotating in spaced parallel planes, and means for rotating said elements individually to fan the slats into a basket web.

11. In combination with means for gathering a plurality of basket slats, a spreader unit including, a support, an upright axle carried by the support, a plurality of rotatable members mounted on the axle each having means for receiving and holding a slat from the gathering means, means for rotating one of said members, means carried by certain of the members engaging others of the members and rotating the latter members with the former members in staggered relationship to spread the members into spaced angular relationship, whereby the slats carried by the members are fanned into a basket web, and a stapler coacting with the spreader unit.

12. In combination with means for gathering a plurality of basket slats, a spreader unit including, a support, an upright axle carried by the support, a plurality of rotatable members mounted on the axle each having means for receiving and holding a slat from the gathering means, means for rotating one of said members, means carried by certain of the members engaging other of the members after the former members are rotated through a predetermined degree to rotate the latter members therewith in staggered positions to spread all the members into spaced angular relationship, whereby the slats carried by the members are fanned into a basket web, and a stapler coacting with the spreader unit.

13. In combination with means for gathering a plurality of basket slats, a spreader unit including, a support, an upright axle carried by the support, a plurality of rotatable members mounted on the axle each having means for receiving and holding a slat from the gathering means, means for rotating one of said members, trailing hooks carried by certain of the members engaging other of the members after the former members are rotated through a predetermined degree to rotate the latter members therewith in staggered positions to spread all the members into spaced angular relationship, whereby the slats carried by the members are fanned into a basket web, and a stapler coacting with the spreader unit.

JAMES O. FARMER.
ROBERT C. CARROLL.
CLAUDE TILLERY.

REFERENCES CITED

The following references are of record in the file of this patent:

UNITED STATES PATENTS

| Number | Name | Date |
|---|---|---|
| 638,852 | Schaefer | Dec. 12, 1899 |
| 707,605 | Lindt | Aug. 26, 1902 |
| 1,531,355 | St. John | Mar. 31, 1925 |
| 1,752,856 | Schmidtke | Apr. 1, 1930 |
| 1,864,776 | Stubbs | June 28, 1932 |
| 1,981,065 | Newhouse | Nov. 20, 1934 |
| 2,089,918 | Paxton | Aug. 10, 1937 |